(12) United States Patent
Bekritsky et al.

(10) Patent No.: US 12,488,207 B2
(45) Date of Patent: Dec. 2, 2025

(54) TECHNIQUES FOR AUTOMATED BEAM ADJUSTMENT FOR PORTAL DIRECTIONALITY

(71) Applicant: ZEBRA TECHNOLOGIES CORPORATION, Lincolnshire, IL (US)

(72) Inventors: Benjamin J. Bekritsky, Modiin (IL); Sajan Wilfred, Kollam (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/586,025

(22) Filed: Feb. 23, 2024

(65) Prior Publication Data
US 2025/0272522 A1 Aug. 28, 2025

(51) Int. Cl.
*G06K 7/10* (2006.01)
(52) U.S. Cl.
CPC ..... *G06K 7/10851* (2013.01); *G06K 7/10861* (2013.01)
(58) Field of Classification Search
CPC ........... G06K 7/10297; G06K 7/10128; G06K 7/10554; G06K 7/10693; G06K 7/10851; G06K 7/10316; G06K 7/10861
USPC ................................................ 235/454, 383
See application file for complete search history.

(56) References Cited

U.S. PATENT DOCUMENTS

| | | | |
|---|---|---|---|
| 11,949,489 B1 * | 4/2024 | Abdelmonem | H04B 7/10 |
| 2022/0279535 A1 * | 9/2022 | Tsui | H04L 25/0222 |
| 2023/0057661 A1 * | 2/2023 | Awoniyi-Oteri | H04W 24/08 |
| 2023/0131254 A1 * | 4/2023 | Karakkad Kesavan Namboodiri | H04B 7/088 370/252 |
| 2024/0129016 A1 * | 4/2024 | Abdelmonem | H04B 7/06958 |
| 2024/0196238 A1 * | 6/2024 | Huda | H04W 24/02 |

FOREIGN PATENT DOCUMENTS

WO 2024107508 * 5/2024 ......... H04H 10/1129

* cited by examiner

*Primary Examiner* — Daniel St Cyr (57) ABSTRACT

Techniques for automated beam adjustment for portal directionality are disclosed herein. An example apparatus includes: a transceiver configured to emit a plurality of signal beams that each have a respective coverage area and are oriented in a respective direction, one or more processors, and one or more memories communicatively coupled to the one or more processors storing a beam adjustment algorithm. The example apparatus may include instructions that, when executed cause the assembly to: transmit a first signal beam to a set of tags located within a first respective coverage area of the first signal beam while the first signal beam is oriented in a first direction; determine, by the beam adjustment algorithm, that a first tag threshold is violated; and adjust, by the beam adjustment algorithm, an orientation of the first signal beam from the first direction to a second direction.

17 Claims, 6 Drawing Sheets

TECHNIQUES FOR AUTOMATED BEAM ADJUSTMENT FOR PORTAL DIRECTIONALITY

BACKGROUND

Digital technology is utilized in industrial networks for locationing services. More specifically, location data insight is a relevant component of entities seeking to track locations and statuses of their assets, enhance the productivity of their workers, and to generally optimize workflows. As such, development of systems and devices that reliably provide cost-effective, proximity-based asset visibility solutions are a topic of great interest in the field of industrial networking.

However, conventional locationing systems suffer from several drawbacks that prevent them from providing such reliable and effective locationing services. Namely, many conventional locationing systems rely on hardware that is sub-optimally configured and can therefore produce inaccurate results and/or otherwise fail to focus on the relevant assets. For example, a conventional locationing system may utilize static signal beam orientations from a reader to track the locations of dynamic/moving tags. These static beam orientations may be insufficient to maximize readings of such dynamic/moving tags because static ("stray") tags may be located within the field of view (also referenced herein as a "coverage area") of the static beams. Consequently, conventional locationing systems suffer from issues that minimize the accuracy and effectiveness of dynamic tag tracking.

Thus, there is a need for techniques for automated beam adjustment for portal directionality that allows for accurate dynamic tag tracking by a locationing system.

SUMMARY

In some aspects, the techniques described herein relate to an assembly including: a transceiver configured to emit a plurality of signal beams that each have a respective coverage area and are oriented in a respective direction; one or more processors; and one or more memories communicatively coupled to the one or more processors storing a beam adjustment algorithm and instructions that, when executed by the one or more processors, cause the assembly to: transmit, by the transceiver, a first signal beam of the plurality of signal beams to a set of tags located within a first respective coverage area of the first signal beam while the first signal beam is oriented in a first direction, determine, by the beam adjustment algorithm, that a first tag threshold is violated based on a number of first tags located within the first respective coverage area, and adjust, by the beam adjustment algorithm, an orientation of the first signal beam from the first direction to a second direction.

In some aspects, the techniques described herein relate to an assembly, wherein a second number of first tags located within the first respective coverage area of the first signal beam while oriented in the second direction is less than the number of first tags located within the first respective coverage area of the first signal beam while oriented in the first direction.

In some aspects, the techniques described herein relate to an assembly, wherein the first direction and the second direction include a respective azimuth component and a respective elevation component, and the instructions, when executed by the one or more processors, further cause the assembly to adjust the orientation of the first signal beam by: adjusting a first respective azimuth component of the first direction to a second respective azimuth component of the second direction; or adjusting a first respective elevation component of the first direction to a second respective elevation component of the second direction.

In some aspects, the techniques described herein relate to an assembly, wherein the first tags correspond to stray tags, a second number of dynamic tags are also located within the first respective coverage area while the first signal beam is oriented in the first direction, and the first tag threshold corresponds to a ratio of stray tags to dynamic tags.

In some aspects, the techniques described herein relate to an assembly, wherein after adjusting the orientation of the first signal beam to the second direction, the instructions, when executed by the one or more processors, further cause the assembly to: (a) determine, by the beam adjustment algorithm, that the first tag threshold is violated based on a subsequent number of first tags located within the first respective coverage area; (b) adjust, by the beam adjustment algorithm, the orientation of the first signal beam to a subsequent direction; and iteratively perform steps (a) and (b) until the first tag threshold is satisfied.

In some aspects, the techniques described herein relate to an assembly, wherein the instructions, when executed by the one or more processors, further cause the assembly to: determine, by the beam adjustment algorithm, that (i) the second direction or (ii) the first respective coverage area of the first signal beam fails to satisfy a coverage threshold relative to a second signal beam of the plurality of signal beams; and deactivate the first signal beam.

In some aspects, the techniques described herein relate to an assembly, wherein first tags correspond to stray tags, and the instructions, when executed by the one or more processors, further cause the assembly to: receive, by the transceiver, a response signal from a respective tag at a first time indicating that the respective tag is located within the first respective coverage area; receive, by the transceiver, a subsequent response signal from the respective tag at a second time that is different from the first time indicating that the respective tag is located within the first respective coverage area; and determine, by the beam adjustment algorithm, that the respective tag is a stray tag.

In some aspects, the techniques described herein relate to an assembly, wherein the instructions, when executed by the one or more processors, further cause the assembly to: receive, by the transceiver, a second response signal from a second respective tag at the first time indicating that the second respective tag is located within the first respective coverage area; receive, by the transceiver, a third response signal from the second respective tag at the second time indicating that the respective tag is located within a second respective coverage area of a second signal beam of the plurality of signal beams; and determine, by the beam adjustment algorithm, that the second respective tag is an dynamic tag.

In some aspects, the techniques described herein relate to a method including: transmitting, by a transceiver configured to emit a plurality of signal beams that each have a respective coverage area and are oriented in a respective direction, a first signal beam of the plurality of signal beams to a set of tags located within a first respective coverage area of the first signal beam while the first signal beam is oriented in a first direction; determining, by a beam adjustment algorithm, that a first tag threshold is violated based on a number of first tags located within the first respective coverage area; and adjusting, by the beam adjustment algorithm, an orientation of the first signal beam from the first direction to a second direction.

In some aspects, the techniques described herein relate to a method, wherein a second number of first tags located within the first respective coverage area of the first signal beam while oriented in the second direction is less than the number of first tags located within the first respective coverage area of the first signal beam while oriented in the first direction.

In some aspects, the techniques described herein relate to a method, wherein the first direction and the second direction include a respective azimuth component and a respective elevation component, and the method further includes adjusting the orientation of the first signal beam by: adjusting a first respective azimuth component of the first direction to a second respective azimuth component of the second direction; or adjusting a first respective elevation component of the first direction to a second respective elevation component of the second direction.

In some aspects, the techniques described herein relate to a method, wherein the first tags correspond to stray tags, a second number of dynamic tags are also located within the first respective coverage area while the first signal beam is oriented in the first direction, and the first tag threshold corresponds to a ratio of stray tags to dynamic tags.

In some aspects, the techniques described herein relate to a method, wherein after adjusting the orientation of the first signal beam to the second direction, the method further includes: (a) determining, by the beam adjustment algorithm, that the first tag threshold is violated based on a subsequent number of first tags located within the first respective coverage area; (b) adjusting, by the beam adjustment algorithm, the orientation of the first signal beam to a subsequent direction; and iteratively performing steps (a) and (b) until the first tag threshold is satisfied.

In some aspects, the techniques described herein relate to a method, further including: determining, by the beam adjustment algorithm, that (i) the second direction or (ii) the first respective coverage area of the first signal beam fails to satisfy a coverage threshold relative to a second signal beam of the plurality of signal beams; and deactivating the first signal beam.

In some aspects, the techniques described herein relate to a method, wherein first tags correspond to stray tags, and the method further includes: receiving, by the transceiver, a response signal from a respective tag at a first time indicating that the respective tag is located within the first respective coverage area; receiving, by the transceiver, a subsequent response signal from the respective tag at a second time that is different from the first time indicating that the respective tag is located within the first respective coverage area; and determining, by the beam adjustment algorithm, that the respective tag is a stray tag.

In some aspects, the techniques described herein relate to a method, further including: receiving, by the transceiver, a second response signal from a second respective tag at the first time indicating that the second respective tag is located within the first respective coverage area; receiving, by the transceiver, a third response signal from the second respective tag at the second time indicating that the respective tag is located within a second respective coverage area of a second signal beam of the plurality of signal beams; and determining, by the beam adjustment algorithm, that the second respective tag is an dynamic tag.

In some aspects, the techniques described herein relate to a tangible machine-readable medium including instructions that, when executed, cause a machine to at least: transmit, by a transceiver configured to emit a plurality of signal beams that each have a respective coverage area and are oriented in a respective direction, a first signal beam of the plurality of signal beams to a set of tags located within a first respective coverage area of the first signal beam while the first signal beam is oriented in a first direction; determine, by a beam adjustment algorithm, that a first tag threshold is violated based on a number of first tags located within the first respective coverage area; and adjust, by the beam adjustment algorithm, an orientation of the first signal beam from the first direction to a second direction.

In some aspects, the techniques described herein relate to a tangible machine-readable medium, wherein the first direction and the second direction include a respective azimuth component and a respective elevation component, and the instructions, when executed, further cause the machine to adjust the orientation of the first signal beam by: adjusting a first respective azimuth component of the first direction to a second respective azimuth component of the second direction; or adjusting a first respective elevation component of the first direction to a second respective elevation component of the second direction.

In some aspects, the techniques described herein relate to a tangible machine-readable medium, wherein the first tags correspond to stray tags, a second number of dynamic tags are also located within the first respective coverage area while the first signal beam is oriented in the first direction, and the first tag threshold corresponds to a ratio of stray tags to dynamic tags.

In some aspects, the techniques described herein relate to a tangible machine-readable medium, wherein after adjusting the orientation of the first signal beam to the second direction, the instructions, when executed, further cause the machine to: (a) determine, by the beam adjustment algorithm, that the first tag threshold is violated based on a subsequent number of first tags located within the first respective coverage area; (b) adjust, by the beam adjustment algorithm, the orientation of the first signal beam to a subsequent direction; and iteratively perform steps (a) and (b) until the first tag threshold is satisfied.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As previously mentioned, conventional locationing systems generally suffer from accuracy and efficiency issues stemming from, inter alia, insufficiently configured and/or configurable hardware and a corresponding lack of stray tag suppression. For example, many conventional locationing systems utilize static beam signal configurations/orientations and/or unsteerable antennas to track dynamic/moving tags. However, these static beam signal configurations/orientations, and the resulting tracked tags, often include a significant number of stray tags that can reduce the likelihood that the tags of interest (i.e., dynamic tags) are identified and tracked.

To illustrate, a conventional reader may output a static signal beam with a coverage area that is oriented in a direction to partially include a set of static assets (e.g., shelves with stationary products at a grocery store, wall of stacked boxes in an unloaded trailer) and partially include a pathway where assets may be transported. This static signal beam may occasionally poll tags within the coverage area associated with assets being transported along the pathway but will nearly always poll tags associated with the static assets, as they are always within the coverage area. Ideally, the conventional reader would not poll and/or otherwise monitor these static tag locations and instead prioritize processing resources to accurately track locations of the dynamic tags being transported along the pathway. Nevertheless, conventional locationing systems frequently feature static signal beam configurations that either overrepresent static tags and/or are otherwise not positioned along pathways to capture dynamic tags of interest. Accordingly, in general, conventional locationing systems can struggle to accurately track dynamic tags.

It is an objective of the present disclosure to eliminate these and other problems with conventional locationing systems via techniques for automated beam adjustment for portal directionality that may accurately track dynamic tags through a beam adjustment algorithm. In particular, the techniques of the present disclosure alleviate the issues present with conventional systems/devices by essentially determining that stray tags are overrepresented in the polling results for a given signal beam and thereafter adjusting the orientation of that given signal beam to reduce the erroneous capture of such stray tags. As a result, the techniques of the present disclosure accurately track dynamic tags (and their associated assets) with an accuracy that was previously unachievable using conventional techniques.

Thus, in accordance with the above, and with the disclosure herein, the present disclosure includes improvements in computer functionality or in improvements to other technologies at least because the present disclosure describes that, e.g., locationing systems, and their related various components, may be improved or enhanced with the disclosed beam adjustment algorithm that provides more accurate locationing/tracking services for dynamic tags and corresponding assets. That is, the present disclosure describes improvements in the functioning of a locationing system itself or "any other technology or technical field" (e.g., the field of distributed/industrial locationing systems) because the disclosed beam adjustment algorithm improves and enhances operation of locationing systems by introducing dynamic signal beam orientation/direction adjustments to eliminate/reduce erroneous static tag logging and other inefficiencies typically experienced over time by locationing systems lacking such a beam adjustment algorithm. This improves the state of the art at least because such previous locationing systems are inaccurate as they lack the ability for dynamically adjusting signal beam orientations/directions in the manners described herein.

In addition, the present disclosure includes applying various features and functionality, as described herein, with, or by use of, a particular machine, e.g., a tag, a reader, a server, and/or other hardware components as described herein.

Moreover, the present disclosure includes specific features other than what is well-understood, routine, conventional activity in the field, or adding unconventional steps that demonstrate, in various embodiments, particular useful applications, e.g., transmitting, by a transceiver, a first signal beam of the plurality of signal beams to a set of tags located within a first respective coverage area of the first signal beam while the first signal beam is oriented in a first direction; determining, by a beam adjustment algorithm, that a first tag threshold is violated based on a number of first tags located within the first respective coverage area, and/or adjusting, by the beam adjustment algorithm, an orientation of the first signal beam from the first direction to a second direction, among others.

Figure 1:
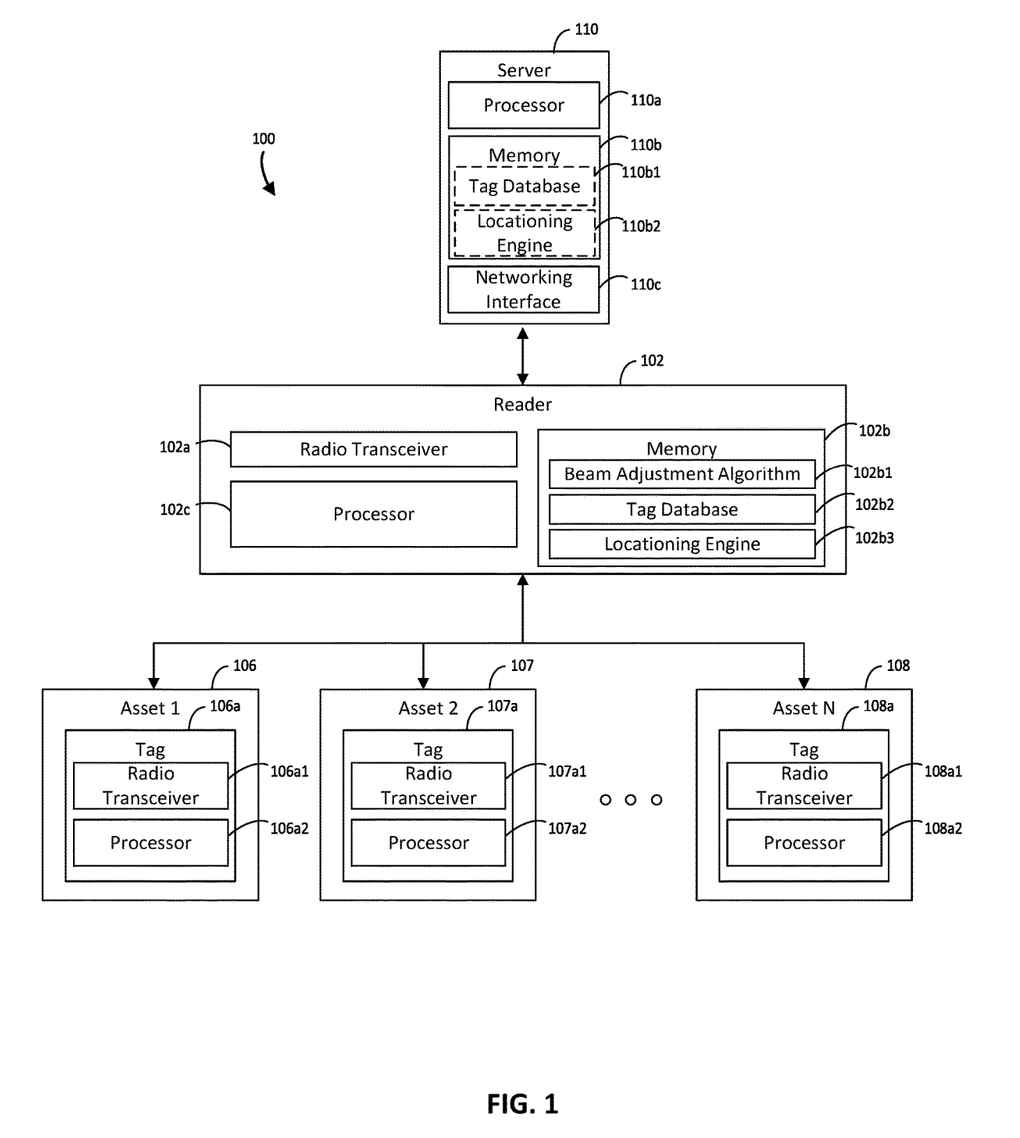
FIG. 1 depicts an example environment in which systems/devices for automated beam adjustment for portal directionality may be implemented, in accordance with various embodiments described herein.

Turning to the figures, FIG. 1 depicts an example environment 100 in which systems/devices for automated beam adjustment may be implemented, in accordance with embodiments described herein. The example environment 100 may comprise, include, and/or otherwise be a part of a networking environment in which the systems/devices of the present disclosure may operate. In the example embodiment of FIG. 1, the example environment 100 includes a reader 102 that is communicatively coupled to a first tag 106a of a first asset 106, a second tag 107a of a second asset 107, a third tag 108a of an N$^{th}$ asset 108, and a server 110. Generally speaking, the reader 102, the first tag 106a, the second tag 107a, the third tag 108a, and/or the server 110 may be capable of executing instructions to, for example, implement operations of the example methods described herein, as may be represented by the flowcharts of the drawings that accompany this description. Namely, the reader 102 may be connected to the first tag 106a, the second tag 107a, the third tag 108a, and/or the server 110 across multiple communication channels and may generally be configured to receive and process information received from the first tag 106a, the second tag 107a, the third tag 108a, and/or the server 110.

The example environment 100 may be or include any suitable real-world environment, such as a grocery store, loading warehouse, hospital, etc., and the area(s) of interest covered by the reader 102 may be or include high travel density asset pathways corresponding to the real-world environment. For example, an area of interest covered by the signal beams of the reader 102 may include an entry/exit pathway to/from a grocery store, where the reader 102 may track dynamic assets as entities enter/exit the store. As another example, an area of interest may be individual loading docks, storage areas, movement pathways for equipment/machinery, etc. within a warehouse.

In any event, the reader 102 stores a tag database 102b2 and a locationing engine 102b3, and the server 110 may optionally store a tag database 110b1 and a locationing engine 110b2. The tag database 102b2, 110b1 may be or include a listing of tags (e.g., tag 106a, tag 107a, tag 108a) that are proximate to specific anchors (e.g., reader 102) and/or otherwise transmit data to/from the particular anchor(s). More specifically, the tag database 102b2, 110b1 listings may include identification information about each of the tags 106a, 107a, 108a and/or the assets 106, 107, 108 associated with the tags 106a, 107a, 108a, as well as location information determined by the reader 102. The tag database 102b2, 110b1 may include any suitable information related to the tags and/or the assets associated with the tags.

To update the tag database 102b2, 110b1, the reader 102 may periodically request and/or otherwise receive updates from various tags (e.g., tag 106a, tag 107a, tag 108a) disposed around an environment (e.g., example environment 100), and the reader 102 may determine (via the one or more processors 102c) one or more tags indicated in the received data. The reader 102 may then update the tag listing for each tag 106a, 107a, 108a by inputting the data received from the respective tags 106a, 107a, 108a into the corresponding tag listing of the tag database 102b2, 110b1. For example, the tag database 102b2, 110b1 may indicate at a first time that the reader 102 received data from the first tag 106a and the second tag 107a. At a second time, the reader 102 may transmit a request to and/or may otherwise receive an update from proximate tags indicating that the reader 102 received/captured data from the first tag 106a, the second tag 107a, and the third tag 108a. Thus, the entries of the tag database 102b2, 110b1 may indicate that the $N^{th}$ asset 108 moved into a receptive proximity of the reader 102 at some point between the first time and the second time, such that the reader 102 was able to receive data transmitted from the third tag 108a at the second time.

In certain embodiments, the first asset 106, the second asset 107, and/or the $N^{th}$ asset 108 may be static assets or dynamic assets. Continuing the prior example, the first asset 106 and the second asset 107 may be static assets within the coverage area of one or more signal beams of the reader 102, as indicated by the received data from both tags 106a, 107a at the first time and the second time. The $N^{th}$ asset 108 may be a dynamic asset within the coverage area of the one or more signal beams of the reader 102, as indicated by the reader 102 receiving data from the $N^{th}$ asset tag 108a only at the second time. Accordingly, in this example, the first tag 106a and the second tag 107a may be static tags and the $N^{th}$ tag 108a may be a dynamic tag with respect to the reader 102.

As referenced herein, a "coverage area" of a signal beam may generally refer to the cross-sectional area or volume covered by the signal beam, as emitted by the radio transceiver 102a. These signal beams may generally have circular cross-sectional profiles of any suitable dimensions, but it should be appreciated that the signal beams may be output through guides and/or other suitable devices to shape the signal beams into any desired cross-sectional profile. For example, the reader 102 may be disposed on a ceiling near an entrance/exit (i.e., a "portal") of a grocery store, and a first signal beam emitted by the reader 102 may have a coverage area with a one-meter diameter at the floor of the portal. Thus, the total coverage area of the first signal beam may include a three-dimensional cone extending from a point at the radio transceiver 102a to the one-meter diameter circle at the portal floor.

Regardless, the reader 102 may also include a locationing engine 102b3, and the server 110 may optionally include a locationing engine 110b2, which generally analyzes data received from the tags 106a, 107a, 108a to update locations of the tags 106a, 107a, 108a. More specifically, the locationing engine 102b3, 110b2 may analyze data packets and/or information extracted and/or otherwise derived from the data packets to determine a direction of travel along which each tag 106a, 107a, 108a is currently traveling. Such data packets may generally be or include identification information corresponding to the tags 106a, 107a, 108a and/or the associated assets 106, 107, 108, remaining battery life information, asset-specific data payloads, and/or any other suitable data or combinations thereof. The reader 102 may transmit polling requests or query repeat commands to receive data from the tags 106a, 107a, 108a at any suitable transmission rate such as every several milliseconds, every second, several seconds, minutes, and/or any other suitable frequency. In certain embodiments, data packets transmitted to/from any particular tag 106a, 107a, 108a may be or include an ultra-high frequency (UHF) radio-frequency identification (RFID) signal and/or any other suitable data packets or signals.

When the locationing engine 110b2 determines the current location/position for a particular tag, the locationing engine 110b2 may also analyze prior data transmitted from the particular tag to determine whether the current location/position is different from a prior location/position determined from the prior data. For example, the locationing engine 110b2 may receive data from a first tag and determine that the first tag is estimated to be in a first location, as registered by a first signal beam from the reader 102. The locationing engine 110b2 may then analyze prior data corresponding to the first tag (e.g., as stored in the tag database 110b1) and determine that the last report from the first tag indicated that the first tag was located in a second (e.g., prior) location/position at the time the last report was transmitted from the first tag, as registered by a second signal beam from the reader 102. Consequently, the locationing engine 110b2 may determine that the first tag has changed location from the second location/position to the first location/position during the time interval that elapsed between the last report and the current report from the first tag. However, it should be appreciated that the locationing engine 110b2 may determine differences in location/position for an individual tag based on multiple signals received from a single signal beam over time. Additionally, it should be appreciated that the beam adjustment algorithm 102b1 may perform some/all of the functions described herein as performed by the locationing engine 110b2, and vice versa.

As another example, the locationing engine 110b2 may receive data from a second tag and determine that the second tag is estimated to be in a third location, as registered by a third signal beam from the reader 102. The locationing engine 110b2 may then analyze prior data corresponding to the second tag (e.g., as stored in the tag database 110b1) and determine that the last report from the second tag indicated that the second tag was located in the third location at the time the last report was transmitted from the second tag. Consequently, the locationing engine 110*b*2 may determine that the second tag has remained in the third location during the time interval that elapsed between the last report and the current report from the second tag, and may identify the second tag as a static tag. The locationing engine 110*b*2 may transmit this information to the beam adjustment algorithm 102*b*1, which may determine that the orientation/direction of the third signal beam should be adjusted to remove the second tag from the coverage area of the third signal beam.

As part of these communications between the server 110 and the individual tags 106*a*, 107*a*, 108*a*, the reader 102 may receive data from the server 110 and capture data from the tags 106*a*, 107*a*, 108*a*, and may transmit communications based on that received/captured data to the server 110 and/or the tags 106*a*, 107*a*, 108*a*. Broadly speaking, the reader 102 may be configured to transmit and receive data to/from the server 110 and nearby tags (e.g., the first tag 106*a*, the second tag 107*a*, the third tag 108*a*). In certain embodiments, the reader 102 may be an UHF RFID reader device that communicates with some/all of the devices in the environment 100 via UHF radio signals. In some embodiments, the reader 102 may be a device that executes and/or conforms to any suitable software operating system (e.g., Android, IOS), a custom Internet of Things (IoT) bridge device with a UHF radio, and/or any other suitable device or combination thereof.

Namely, the reader 102 may be configured to periodically listen for data packets from nearby tags (e.g., tags 106*a*, 107*a*, 108*a*), transmit the data packets and/or data obtained therein to the server 110, and/or broadcast requests received from the server 110 to such nearby tags. As an example, the reader 102 may receive requests from the server 110, and may subsequently transmit requests to proximate tags 106*a*, 107*a*, 108*a* based on the requests. Such requests from the server 110 may be or include instructions causing the tags 106*a*, 107*a*, 108*a* to transmit identification data to the reader 102 and/or other suitable instructions or combinations thereof.

The reader 102 may also transmit and receive data (e.g., data packets) to/from any of the tags 106*a*, 107*a*, 108*a* and to calculate signal beam direction/orientation adjustments based on the data received from those tags 106*a*, 107*a*, 108*a* by executing the beam adjustment algorithm 102*b*1 stored in memory 102*b*. The reader 102 may then transmit these signal beam orientation/direction adjustments, along with some/all of the received data from the tags 106*a*, 107*a*, 108*a*, to the server 110 for tracking and/or otherwise notifying a user (e.g., a locationing system administrator) of a location/position of an asset 106, 107, 108 associated with the tags 106*a*, 107*a*, 108*a*.

As referenced herein, the signal beam orientation/direction adjustments determined and implemented as a result of the beam adjustment algorithm 102*b*1 may be or include any suitable adjustments to the orientation, directionality, and/or configuration of an individual signal beam and/or a set of signal beams emitted by the reader 102. For example, a first adjustment determined by the beam adjustment algorithm 102*b*1 may cause the reader 102 to reposition the coverage area of a first signal beam by five degrees in any suitable direction (e.g., positive/negative azimuth, positive/negative elevation). As a second example, a second adjustment determined by the beam adjustment algorithm 102*b*1 may cause the reader 102 to reposition the coverage area of a second signal beam and a third signal beam by ten degrees in similar/identical directions or dissimilar/opposite directions.

As a third example, a third adjustment determined by the beam adjustment algorithm 102*b*1 may cause the reader 102 to deactivate a fourth signal beam because repositioning the coverage area of the fourth signal beam in an optimal direction (e.g., positive azimuth) by an optimal degree (e.g., six degrees) would result in a coverage area overlap between the fourth signal beam and a fifth signal beam that violates, exceeds, and/or otherwise fails to satisfy a coverage overlap threshold. This deactivation may therefore minimize coverage area redundancy of emitted signal beams.

Moreover, as illustrated in the prior examples, it should be appreciated that the "optimal" direction and/or degree determined and implemented by the beam adjustment algorithm 102*b*1 to adjust signal beam orientation/direction may be any suitable direction and/or degree or combinations thereof. Namely, an optimal direction adjustment determined by the beam adjustment algorithm 102*b*1 may include an adjustment in an isolated direction (e.g., only azimuth, only elevation) or a composite direction and may include an adjustment of any suitable degree value. For example, a first adjustment determined by the beam adjustment algorithm 102*b*1 for a first signal beam may cause the radio transceiver 102*a* to adjust the coverage area of the first signal beam by two degrees in the positive azimuth direction and three degrees in the negative elevation direction.

Generally, the beam adjustment algorithm 102*b*1 may be or include instructions causing the processors 102*c* of the reader 102 to determine that a stray tag threshold has been violated for a signal beam and corresponding adjustment(s) to the direction/orientation of the signal beam. The stray tag threshold may be or include a percentage or ratio of the stray tags to dynamic tags or to total tags within the signal beam coverage area. In other words, if the stray tag threshold is violated, then the associated signal beam coverage area is currently located over a larger number of stray tags than is acceptable to achieve high accuracy/granularity dynamic tag tracking. Accordingly, the beam adjustment algorithm 102*b*1 may determine and cause the radio transceiver 102*a* to implement an adjustment to the signal beam orientation/direction to reduce the number of stray tags included within the coverage area.

As part of determining/evaluating the stray tag threshold, the beam adjustment algorithm 102*b*1 may first analyze tag response signals for proximate tags over time to determine which tags within a particular signal beam coverage area is/are stray tags. The beam adjustment algorithm 102*b*1 may analyze consecutive responses from tags within signal beam coverage areas to determine whether the period during which an individual tag has remained within a signal beam coverage area exceeds a period of time threshold. If the algorithm 102*b*1 determines that the threshold is exceeded, the algorithm 102*b*1 may identify the corresponding tag as a stray tag.

For example, at a first time, the reader 102 may receive a response signal from a first tag, indicating that the first tag is within the coverage area of a first signal beam emitted from the radio transceiver 102*a*. At a second time, the reader 102 may receive a subsequent response signal from the first tag indicating that the first tag is still located within the coverage area of the first signal beam. The beam adjustment algorithm 102*b*1 may analyze these response signals from the first tag and determine that the first tag has remained within the coverage area of the first signal beam for longer than a threshold period, such that the first tag is likely a stray tag that is statically positioned within the coverage area of the first signal beam. Accordingly, the beam adjustment algorithm 102*b*1 may identify the first tag as a stray tag and may proceed to evaluate whether the stray tag threshold is violated for the first signal beam by including the first tag as one of the number of stray tags.

Once the beam adjustment algorithm 102b1 determines that the stray tag threshold is violated for a signal beam, the algorithm 102b1 may determine an adjustment to the signal beam orientation/direction to reduce the number of stray tags contained within the coverage area. In certain embodiments, the adjustment may be a pre-determined value, such as five degrees in any suitable direction (e.g., azimuth, elevation). However, the beam adjustment algorithm 102b1 may also dynamically generate orientation/direction adjustments based on the estimated locations of the stray tags. The locationing engine 110b2 may return estimated locations for the stray tags, and the beam adjustment algorithm 102b1 may determine an optimal orientation/direction adjustment for the signal beam that may eliminate most/all stray tags within the signal beam coverage area.

For example, a first signal beam may be oriented such that three stray tags are located within the coverage area at a far edge. The beam adjustment algorithm 102b1 may determine that these three stray tags violate the stray tag threshold and determine that the first signal beam orientation/direction should be adjusted. The algorithm 102b1 may receive estimated locations of the three stray tags from the locationing engine 110b2 and determine that an adjustment of two degrees in the negative azimuthal direction will likely be sufficient to remove the three stray tags from the coverage area. The algorithm 102b1 may then generate an instruction for a two-degree negative azimuthal adjustment to the first signal beam, which may cause the radio transceiver 102a to adjust the direction/orientation of the first signal beam by two-degrees in the negative azimuthal direction.

Of course, it should be appreciated that the beam adjustment algorithm 102b1 may be or include any suitable instructions that enable the reader 102 and/or any other suitable device(s) (e.g., server 110) to evaluate stray tag thresholds for signal beams, determine direction/orientation adjustments for the signal beams, and/or perform other suitable adjustments to the signal beam configuration(s) (e.g., turning signal beams off, changing the signal beam configuration).

The reader 102 may also include a radio transceiver 102a configured to transmit/receive data streams to/from various devices of the example environment 100, such as the server 110 and the tags 106a, 107a, 108a. The radio transceiver 102a may include an antenna with an associated gain profile corresponding to the transceiver's 102a antenna converting input power into radio waves (e.g., transmission) and/or received radio waves into electrical power (e.g., receiving). More specifically, the radio transceiver 102a may be a phased-array antenna configured to steer transmitted and received signal beams in various directions. This phased-array configuration enables the reader 102 and/or the server 110 to accurately determine the bearing (i.e., location in azimuth and elevation) of any tag within the coverage area of signal beams transmitted by the radio transceiver 102a each time the tag is captured by a signal beam.

The assets 106, 107, 108 may generally be any device, component, or object that an entity may desire to track and/or otherwise locate. For example, the assets 106, 107, 108 may be large and calibrated tools used in and/or for oil and gas equipment/operations, parcels for delivery by a shipping company, hospital equipment that is and/or may be moved to different floors/rooms, wristbands attached to hospital patients, and/or any other suitable objects or combinations thereof. While illustrated as three assets 106, 107, 108, it should be appreciated that the reader 102 may simultaneously communicate with any suitable number of assets 106, 107, 108 via the associated tags 106a, 107a, 108a. Thus, the $N^{th}$ asset 108 may be a third asset, a fifth asset, a twentieth asset, a one-hundredth asset, and/or any other integer value asset.

Each asset 106, 107, 108 may also include a corresponding tag 106a, 107a, 108a that may be configured to respond to polling requests by transmitting information associated with the asset via the radio transceiver 106a1, 107a1, 108a1 to, for example, the reader 102. Each asset tag 106a, 107a, 108a may also include one or more processors 106a2, 107a2, 108a2 configured to interpret and/or execute such polling requests and/or other instructions contained in signals received from the reader 102, server 110, and/or other suitable device(s). For example, the processors 106a2, 107a2, 108a2 may be configured to interpret polling requests and/or other signals received from the reader 102 and thereby transmit data packets to the reader 102.

Moreover, in certain embodiments, a workstation (not shown) may be communicatively connected to the server 110, and a user/operator may access the server 110 to retrieve a location associated with an asset 106, 107, 108. The workstation may query the server 110 with the identification tag of the corresponding asset 106, 107, 108, and the server 110 may match the identification tag with a location entry in the tag database 110b1 associated with the corresponding asset 106, 107, 108. The server 110 may then forward the location entry to the workstation for viewing by the user/operator.

More generally, the one or more memories 102b, 110b may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., beam adjustment algorithm 102b1, and/or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 102c, 110a (e.g., working in connection with a respective operating system in the one or more memories 102b, 110b) to facilitate, implement, or perform the machine readable instructions, methods, processes, elements or limitations, as illustrated, depicted, or described for the various flowcharts, illustrations, diagrams, figures, and/or other disclosure herein.

In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.). Moreover, the one or more memories 102b, 110b may also store machine readable instructions, including any of one or more application(s), one or more software component(s), and/or one or more APIs, which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein.

The one or more processors 102c, 110a may be connected to the one or more memories 102b, 110b via a computer bus (not shown) responsible for transmitting electronic data, data packets, or otherwise electronic signals to and from the one or more processors 102c, 110a and one or more memories 102b, 110b to implement or perform the machine readable instructions, methods, processes, elements or limitations, as illustrated, depicted, or described for the various flowcharts, illustrations, diagrams, figures, and/or other disclosure herein.

The one or more processors 102c, 110a may interface with the one or more memories 102b, 110b via the computer bus to execute any suitable application or executable instructions (e.g., beam adjustment algorithm 102b1) necessary to perform any of the actions associated with the methods of the present disclosure. The one or more processors 102c, 110a may also interface with the one or more memories 102b, 110b via the computer bus to create, read, update, delete, or otherwise access or interact with the data stored in the one or more memories 102b, 110b and/or external databases (e.g., a relational database, such as Oracle, DB2, MySQL, or a NoSQL based database, such as MongoDB). The data stored in the one or more memories 102b, 110b and/or an external database may include all or part of any of the data or information described herein, including, for example, asset tag 106a, 107a, 108a data packets, asset location data, beam adjustment data/thresholds, stray tag thresholds, and/or other suitable information or combinations thereof.

The radio transceivers 102a, 106a1, 107a1, 108a1 and the networking interface 110c may be configured to communicate (e.g., send and receive) data via one or more external/network port(s) to one or more networks or local terminals, as described herein. In some embodiments, the radio transceivers 102a, 106a1, 107a1, 108a1 and/or the networking interface 110c may include a client-server platform technology such as ASP.NET, Java J2EE, Ruby on Rails, Node.js, a web service or online API, responsive for receiving and responding to electronic requests. The radio transceivers 102a, 106a1, 107a1, 108a1 and/or the networking interface 110c may implement the client-server platform technology that may interact, via the computer bus, with the one or more memories 102b, 110b (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the radio transceivers 102a, 106a1, 107a1, 108a1 and/or the networking interface 110c may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to a network. In some embodiments, the network (not shown) may comprise a private network or local area network (LAN). Additionally, or alternatively, the network may comprise a public network such as the Internet. In some embodiments, the network may comprise routers, wireless switches, or other such wireless connection points communicating to the server 110 (via networking interface 110c) via wireless communications based on any one or more of various wireless standards, including by non-limiting example, an RFID standard, a BLUETOOTH standard (e.g., BLE), IEEE 802.11a/b/c/g (WIFI), or the like.

Figure 2A:
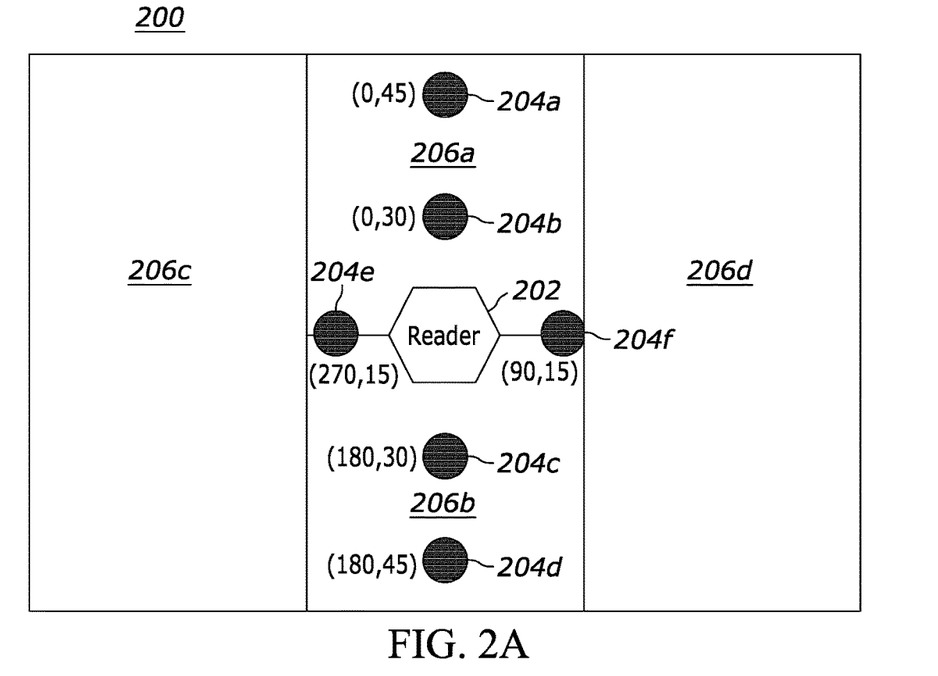
FIG. 2A depicts an example signal beam configuration for automated beam adjustment for portal directionality, in accordance with various embodiments described herein.

To illustrate a scenario where a reader and asset tag(s) may transmit and/or receive data packets and determine signal beam adjustments from those data packets, FIG. 2A depicts an example signal beam configuration 200 for automated beam adjustment for portal directionality, in accordance with various embodiments described herein. In particular, the example configuration 200 illustrated in FIG. 2A depicts a reader 202 transmitting a plurality of signal beams 204a-f, which for the purposes of simplicity, are illustrated in FIG. 2A by their cross-sectional profiles at ground level. The example configuration 200 further includes four zones 206a-d. The first zone 206a and the second zone 206b may be zones of interest, and the third zone 206c and the fourth zone 206d may not be zones of interest. For example, the first zone 206a and the second zone 206b may represent a pathway leading to/from an entrance/exit portal of a department store, where the first zone 206a is outside the store and the second zone 206b is inside the store.

Each signal beam 204a-f has a current orientation/direction, as illustrated by the parenthetical numbers proximate to each signal beam 204a-f. The orientation/direction for a particular signal beam may be in terms of any suitable dimensions, such as degrees of azimuth and elevation. For example, the first signal beam 204a has an orientation/direction of zero degrees in the azimuthal direction and 45 degrees in the elevation direction. Similarly, the second signal beam 204b has an orientation/direction of zero degrees in the azimuthal direction and 30 degrees in the elevation direction, the third signal beam 204c has an orientation/direction of 180 degrees in the azimuthal direction and 30 degrees in the elevation direction, the fourth signal beam 204d has an orientation/direction of 180 degrees in the azimuthal direction and 45 degrees in the elevation direction, the fifth signal beam 204e has an orientation/direction of 270 degrees in the azimuthal direction and 15 degrees in the elevation direction, and the sixth signal beam 204f has an orientation/direction of 90 degrees in the azimuthal direction and 15 degrees in the elevation direction.

As previously mentioned, the signal beams emitted by a reader may have any suitable configuration, such as the specific configuration 200 illustrated in FIG. 2A. As referenced herein, a "signal beam configuration" may generally refer to the orientation(s)/direction(s) of all signal beams emitted by a reader (e.g., reader 202) at a particular time. For example, the signal beam configuration 200 emitted by the reader 202 features four signal beams 204a, 204b, 204c, 204d emitted along a line extending from a first zone 206a into a second zone 206b and two signal beams 204e, 204f straddling the boundary between the first zone 206a and the second zone 206b. In certain embodiments, the reader 202 may have multiple pre-programmed signal beam configurations to cover the path from the second zone 206b (e.g., "inside") to the first zone 206a (e.g., "outside"). Regardless, each of the signal beam configurations is intended to cover the zones of interest (e.g., first zone 206a, second zone 206b) well enough to read dynamic tags at least twice in each zone of interest as the dynamic tags move through the coverage areas of the reader 202 while not dwelling too long in one area, and thereby avoid missing other dynamic tags.

More specifically, the signal beam configuration 200 of FIG. 2A may be intended to read dynamic tags in the first zone 206a (e.g., "outside") and then in the second zone 206b (e.g., "inside"), or vice-versa, and report the direction of travel between the zones 206a, 206b. The accuracy of a directionality estimation performed by the reader 202 and/or other suitable device(s) is generally a function of the number of times a dynamic tag is read as the tag traverses the coverage areas of the reader 202. In other words, the more frequently the dynamic tag is read as it passes by the reader 202, the more likely the reader 202 will have enough bearing estimate samples to produce a correct directionality estimate. Conversely, the less frequently the dynamic tag is read as it passes by the reader 202, the less likely the reader 202 will have enough bearing estimate samples to produce a correct directionality estimate.

Figure 2B:
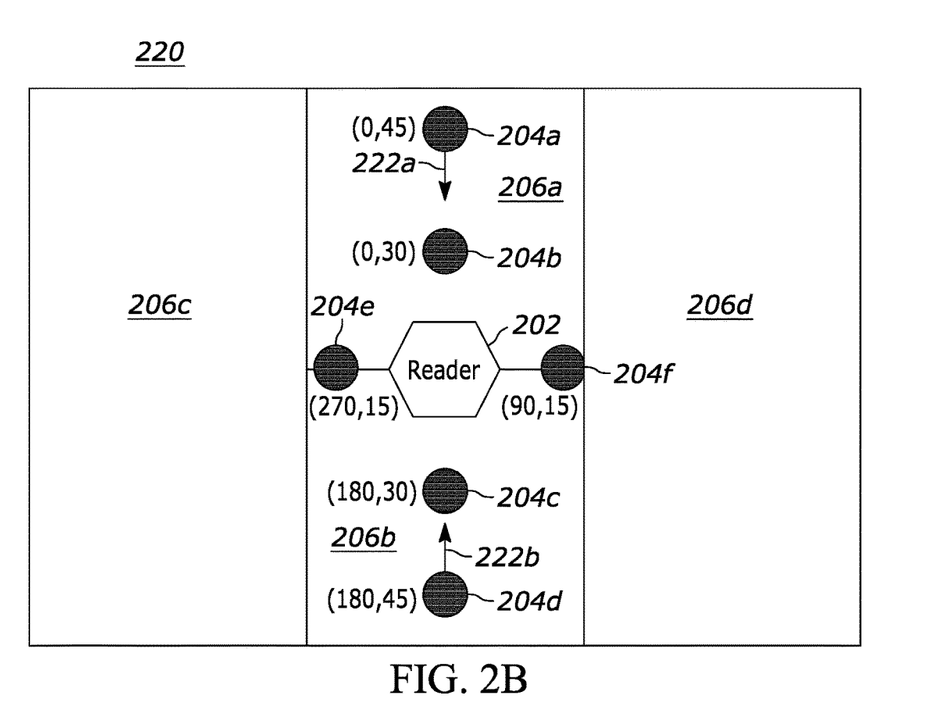
FIG. 2B depicts an example signal beam adjustment relative to the configuration of FIG. 2A, in accordance with various embodiments described herein.

Accordingly, optimally positioning the signal beams 204a-f within the zones of interest (e.g., first zone 206a, second zone 206b) is of paramount importance to ensure that dynamic tags are read as frequently as possible. As previously mentioned, reducing the number of stray tag reads greatly advances these efforts to increase dynamic tag read frequency, and an example signal beam adjustment 220 configured to reduce stray tag reads is illustrated in FIG. 2B. In particular, FIG. 2B depicts an example signal beam adjustment 220 relative to the configuration 200 of FIG. 2A, in accordance with various embodiments described herein.

When stray tags are within the coverage areas of the signal beams 204a-f, the reader 202 will spend time reading these stray tags and reduce the time the reader 202 can read the tags of interest (e.g., dynamic tags). As a result, the reader 202 will capture fewer signals and/or otherwise data from the dynamic tags as they travel through the coverage areas of the signal beams 204a-f and generate less accurate travel direction determinations of the dynamic tags. Thus, the challenge addressed by the example signal beam adjustment 220 is to limit the stray tag readings while still allowing the dynamic tags to be read enough times to allow the reader 202 and/or other suitable device(s) to make accurate travel direction determinations for the dynamic tags.

Typically, stray tags are not in the path that dynamic tags will take, and the stray tags are on the periphery of the coverage areas of the signal beam configuration. Therefore, the operating principle of the example signal beam adjustment 220 is to adjust any of the signal beams 204a-f that capture data from too many stray tags towards the presumed dynamic tag path in a manner that reduces the number of stray tags being read and gives more opportunity for reading the dynamic tags.

For example, assume that the first signal beam 204a and the fourth signal beam 204d have both captured data from too many stray tags (i.e., violated the stray tag threshold), such that the reader 202 and/or other suitable device(s) determines that the orientation/direction of the signal beams 204a, 204d should be adjusted. In this example, the orientations/directions of the first signal beam 204a and the fourth signal beam 204d may be adjusted (as represented by the arrows 222a, 222b) by five degrees each. The new orientation/direction of the first signal beam 204a may be zero degrees in the azimuthal direction and 40 degrees in the elevation direction, and the new orientation/direction of the fourth signal beam 204d may be 180 degrees in the azimuthal direction and 40 degrees in the elevation direction. Of course, it should be appreciated that the orientation/direction of the signal beams may be adjusted by any suitable amount.

Even such small orientation/direction adjustments to signal beams can yield significant improvements to the ratio of stray-to-dynamic tag reads. To illustrate, real-world tests similar to the prior example featuring adjustments to the orientation/direction of signal beams (e.g., signal beams 204a, 204d) by five degrees resulted in a reduction of the number of total unique tags read by a reader from 43 to 22. This nearly 50% decrease to the number of unique tag reads represented a substantial decrease in the number of stray tags read by the reader, which correspondingly represented a significant increase in the available time for the reader to capture/read dynamic tags.

Moreover, while described herein primarily as a singular process, the orientation/direction adjustments to signal beams may be performed iteratively until the reader 202 and/or other device(s) determine that the signal beams are each optimally oriented. For example, the reader 202 may adjust the orientation/direction of the fourth signal beam 204d five degrees, as illustrated in FIG. 2B, and may subsequently determine that the orientation/direction of the fourth signal beam 204d should be further adjusted by another five degrees and/or any other suitable value(s) (e.g., one degree, two degrees, ten degrees, etc.) in any suitable direction(s). The reader 202 may iteratively adjust the orientation/direction of the fourth signal beam 204d as many times as is necessary until the signals received by the fourth signal beam 204d satisfy the stray tag threshold, as described herein.

Additionally, in certain embodiments, the reader 202 may iteratively adjust the orientation/direction of a signal beam until the reader 202 determines that the signal beam should be deactivated. The reader 202 may receive data from a particular signal beam that fails to satisfy the stray tag threshold, and the reader 202 may adjust the orientation/direction of the particular signal beam. However, when determining the orientation/direction adjustment, the reader 202 may also determine that the resulting direction or the resulting coverage area of the particular signal beam fails to satisfy a coverage threshold relative to another signal beam. The coverage threshold may generally represent (i) a distance metric, below which, a signal beam is considered too close to another signal beam, (ii) a coverage area metric, above which, a signal beam is considered too close to another signal beam, and/or any other suitable metric(s) or combinations thereof. Regardless, when the reader 202 determines the coverage threshold is violated, the reader 202 may deactivate the signal beam to be adjusted or the non-adjusted signal beam.

As an example, assume that the reader 202 determines the orientation/direction of the first signal beam 204a should be adjusted, such that the first signal beam 204a would move substantially closer to the second signal beam 204b. After the adjustment, the new orientation/direction of the first signal beam 204a would be zero degrees in the azimuthal direction and 33 degrees in the elevation direction. The reader 202 (e.g., via the beam adjustment algorithm 102b1) may compare the new orientation/direction of the first signal beam 204a to the current orientation/direction of the second signal beam 204b and determine that the first signal beam 204a would have significant coverage area overlap with the second signal beam 204b. In fact, the reader 202 may determine that the distance between the center of the first signal beam 204a and the center of the second signal beam 204b (e.g., 3 degrees in elevation) may be small enough to violate the coverage threshold, and/or that the coverage area overlap between the first signal beam 204a and the second signal beam 204b may be large enough to violate the coverage threshold. In either case, the reader 202 may determine that either the first signal beam 204a or the second signal beam 204b should be deactivated to reduce tag read redundancy, and may deactivate one of the signal beams 204a, 204b.

Figure 3A:
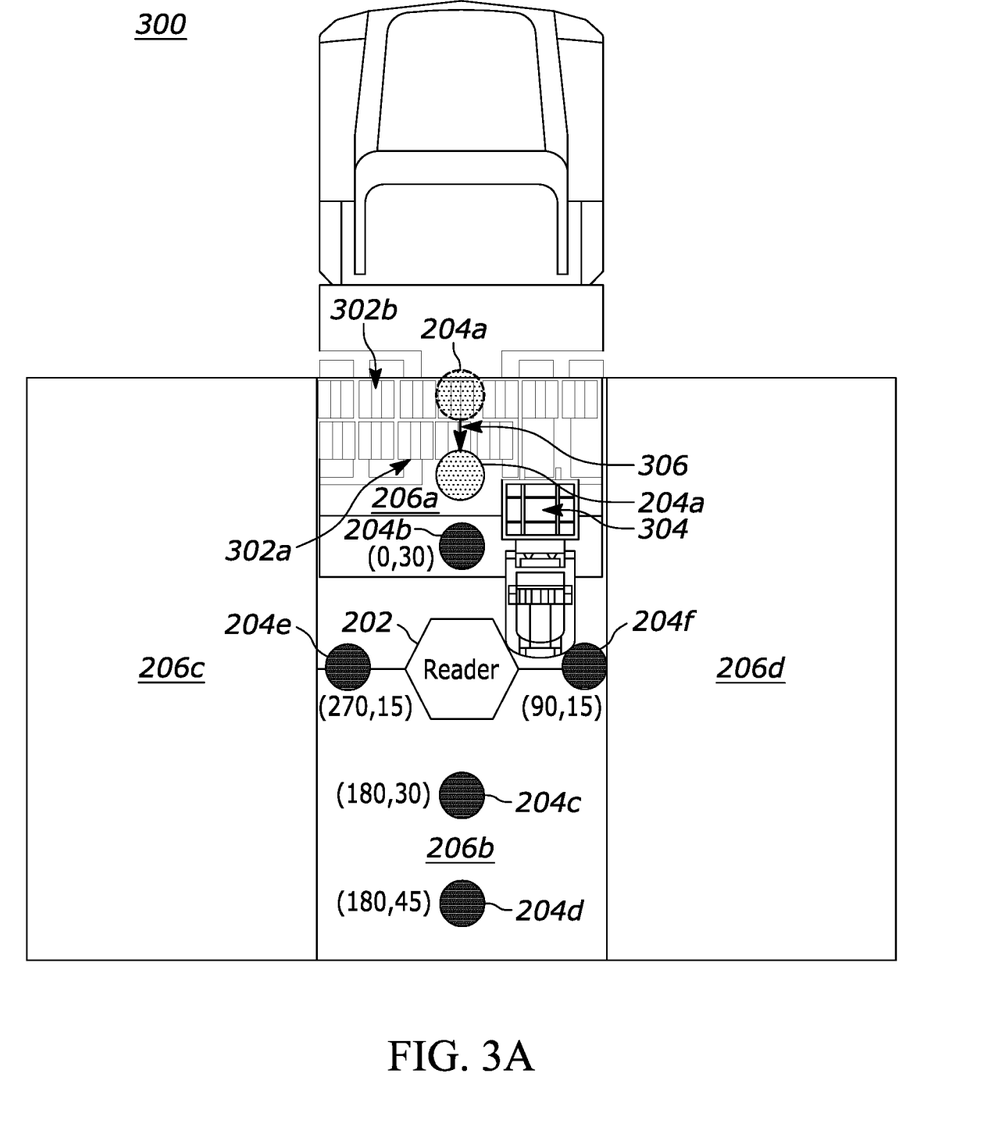
FIG. 3A depicts a first example asset tracking scenario where a signal beam is adjusted to reduce the number of stray tags within the signal beam coverage area, in accordance with various embodiments described herein.

FIG. 3A depicts a first example asset tracking scenario 300 including the signal beam configuration 200 of FIG. 2A, where the first signal beam 204a is adjusted to reduce the number of stray tags within the first signal beam 204a coverage area, in accordance with various embodiments described herein. More specifically, the first example asset tracking scenario 300 is a dock door truck loading/unloading scenario. In a typical dock door truck loading scenario, moving tags become stationary and there is an accumulation of layers or "walls" of stationary (i.e., stray) tags, such as the outer layer 302a and the inner layer 302b. Further, in either a loading scenario or an unloading scenario, the inner layer 302b is built first or removed last, such that the inner layer 302b comprises stray tags longer than any other layer.

Directing a signal beam (e.g., first signal beam 204a) toward the inner layer 302b may thus needlessly saturate the signals received by the signal beam 204a with stray tag reads. To avoid these issues, the reader 202 may adjust the orientation/direction of the first signal beam 204a, as illustrated by the adjustment 306. Thus, as assets 304 are transported to/from the tag wall, the reader 202 may periodically adjust the orientation/direction of the first signal beam 204a to avoid placing the first signal beam 204a coverage area over the most forward tag wall layer (e.g., outer layer 302a). Additionally, or alternatively, the reader 202 may adjust the orientation/direction of the first signal beam 204a such that only the outer layer 302a of tags are monitored for wall break down (i.e., unloading) or buildup (i.e., loading). In this manner, the reader 202 may reduce the number of stationary tags monitored by any individual signal beam and thereby improve the detection accuracy of dynamic tag movement.

Figure 3B:
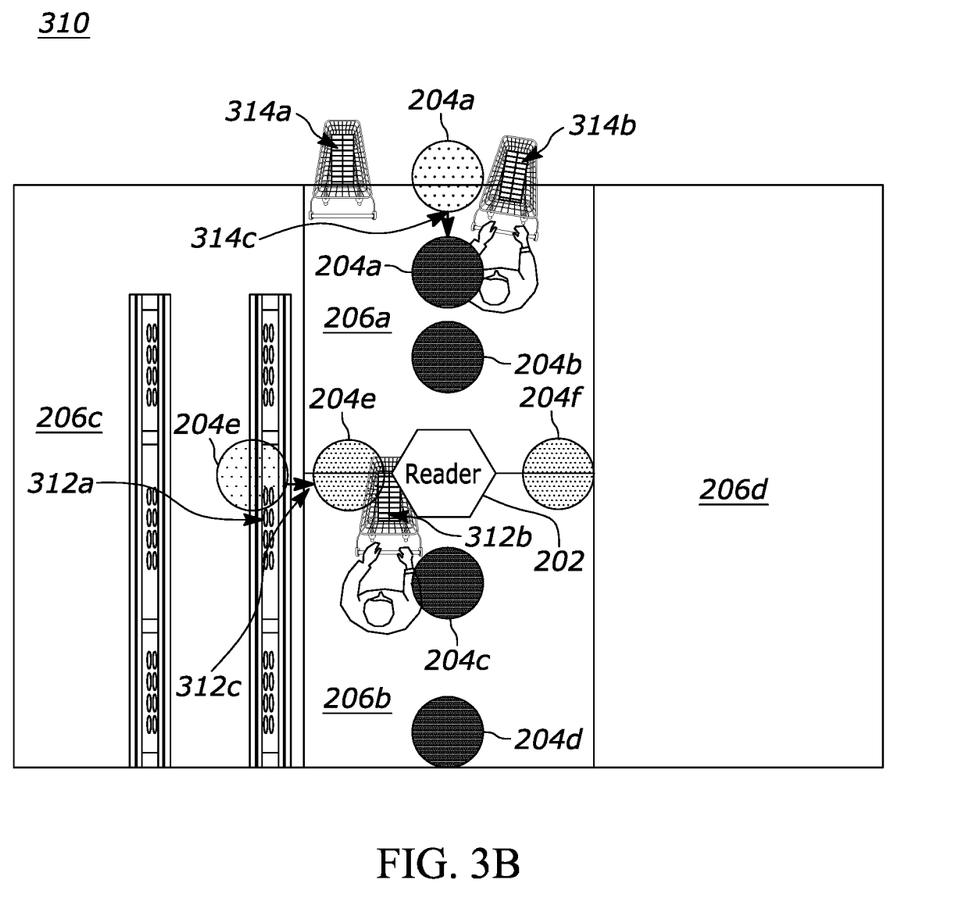
FIG. 3B depicts a second example asset tracking scenario where one or more signal beams are adjusted to reduce the number of stray tags within the signal beam coverage area, in accordance with various embodiments described herein.

FIG. 3B depicts a second example asset tracking scenario 310 including the signal beam configuration 200 of FIG. 2A, where one or more signal beams (e.g., first signal beam 204a and/or fifth signal beam 204e) are adjusted to reduce the number of stray tags within the signal beam coverage area, in accordance with various embodiments described herein. More specifically, the second example asset tracking scenario 310 is a retail store entry/exit portal scenario, where the reader 202 may track the movement directions of tagged items across the entry/exit portal. In such scenarios, stray tags or tags that become stationary are common, and the beam adjustment performed by the reader 202 through the beam adjustment algorithm 102b1 may help focus the signal beams 204a-f on dynamic tags.

As illustrated in FIG. 3B, the fifth signal beam 204e may originally be oriented at least partially into the third zone 206c, where multiple stationary assets 312a and corresponding stray tags are located. To reduce the impact of these stationary assets 312a, the reader 202 may adjust the orientation/direction of the fifth signal beam 204e, as illustrated by the adjustment 312c. As a result of this adjustment 312c, the fifth signal beam 204e may more frequently capture data from dynamic tags 312b that are entering/leaving the retail environment through the entry/exit portal.

Similarly, the first signal beam 204a may originally be oriented far enough outside of the entry/exit portal that the first signal beam 204a is unable to capture data from many dynamic tags 314a, 314b leaving and/or entering the retail location. To increase the likelihood that the first signal beam 204a may capture dynamic tag data, the reader 202 may adjust the orientation/direction of the first signal beam 204a, as illustrated by the adjustment 314c. As a result of this adjustment 314c, the first signal beam 204a may more frequently capture data from dynamic tags 314a, 314b that are entering/leaving the retail environment through the entry/exit portal. However, in certain embodiments, the reader 202 may not adjust the orientation/direction of the first signal beam 204a if, for example, the first signal beam 204a does not capture data from enough stray tags to violate the stray tag threshold. In other words, in these embodiments, the reader 202 may not adjust the orientation/direction of the signal beams when the stray tag threshold is not exceeded/violated.

Figure 4:
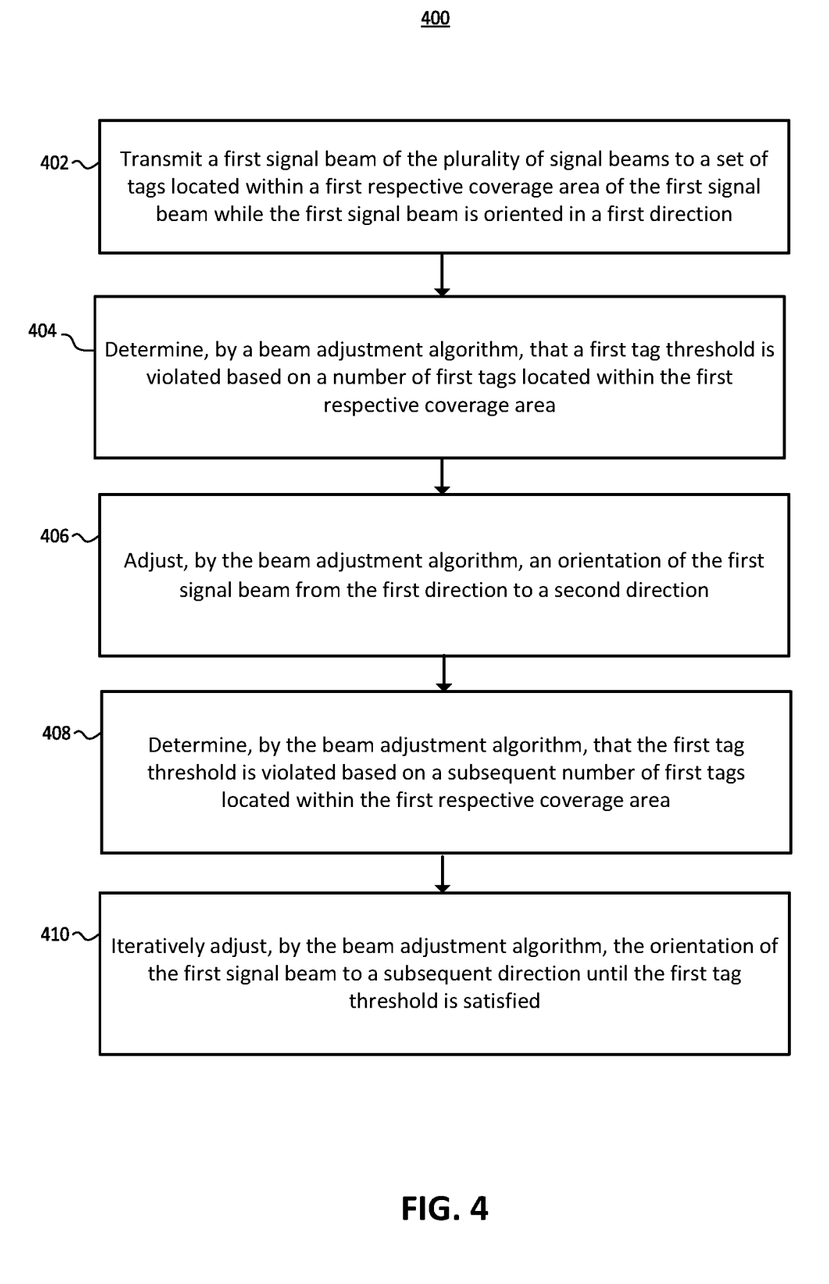
FIG. 4 is a flowchart representative of a method for automated beam adjustment for portal directionality, in accordance with embodiments described herein.

FIG. 4 is a flowchart representative of a method 400 for automated beam adjustment for portal directionality, in accordance with embodiments described herein. Generally, and as described herein, the method 400 for automated beam adjustment for portal directionality may cause the server 110, reader 102, and/or any tags (e.g., tags 106a, 107a, 108a) to determine adjustments to signal beam orientation/direction by evaluating a number of stray tags indicated in the data captured by a signal beam, as compared to a stray tag threshold. More specifically, the method 400 enables the server 110, the reader 102, and the tags (e.g., tags 106a, 107a, 108a) to enhance/improve the accuracy of dynamic tag/asset tracking by adjusting the direction/orientation of a signal beam based on the number of stray tags indicated in the data captured by such signal beam, as described herein. It is to be understood that any of the steps of the method 400 may be performed by, for example, the server 110, the reader 102, tags (e.g., tags 106a, 107a, 108a), and/or any other suitable components or combinations thereof discussed herein.

At block 402, the method 400 includes transmitting, by a transceiver configured to emit a plurality of signal beams that each have a respective coverage area and are oriented in a respective direction, a first signal beam of the plurality of signal beams to a set of tags located within a first respective coverage area of the first signal beam while the first signal beam is oriented in a first direction. The method 400 further includes determining, by a beam adjustment algorithm, that a first tag threshold is violated based on a number of first tags located within the first respective coverage area (block 404). The method 400 further includes adjusting, by the beam adjustment algorithm, an orientation of the first signal beam from the first direction to a second direction (block 406).

Further, at block 408, the method 400 includes determining, by the beam adjustment algorithm, that the first tag threshold is violated based on a subsequent number of first tags located within the first respective coverage area. The method 400 further includes iteratively adjusting, by the beam adjustment algorithm, the orientation of the first signal beam to a subsequent direction until the first tag threshold is satisfied (block 410).

In some embodiments, a second number of first tags located within the first respective coverage area of the first signal beam while oriented in the second direction is less than the number of first tags located within the first respective coverage area of the first signal beam while oriented in the first direction.

In certain embodiments, the first direction and the second direction include a respective azimuth component and a respective elevation component, and the method 400 further includes adjusting the orientation of the first signal beam by: adjusting a first respective azimuth component of the first direction to a second respective azimuth component of the second direction; or adjusting a first respective elevation component of the first direction to a second respective elevation component of the second direction.

In some embodiments, the first tags correspond to stray tags, a second number of dynamic tags are also located within the first respective coverage area while the first signal beam is oriented in the first direction, and the first tag threshold corresponds to a ratio of stray tags to dynamic tags.

In certain embodiments, the method 400 further includes determining, by the beam adjustment algorithm, that (i) the second direction or (ii) the first respective coverage area of the first signal beam fails to satisfy a coverage threshold relative to a second signal beam of the plurality of signal beams; and deactivating the first signal beam.

In some embodiments, the first tags correspond to stray tags, and the method 400 further includes receiving, by the transceiver, a response signal from a respective tag at a first time indicating that the respective tag is located within the first respective coverage area; receiving, by the transceiver, a subsequent response signal from the respective tag at a second time that is different from the first time indicating that the respective tag is located within the first respective coverage area; and determining, by the beam adjustment algorithm, that the respective tag is a stray tag.

In certain embodiments, the method 400 further includes receiving, by the transceiver, a second response signal from a second respective tag at the first time indicating that the second respective tag is located within the first respective coverage area; receiving, by the transceiver, a third response signal from the second respective tag at the second time indicating that the respective tag is located within a second respective coverage area of a second signal beam of the plurality of signal beams; and determining, by the beam adjustment algorithm, that the second respective tag is an dynamic tag.

Of course, it is to be appreciated that the actions of the method 400 may be performed in any suitable order and any suitable number of times.

Figure 5:
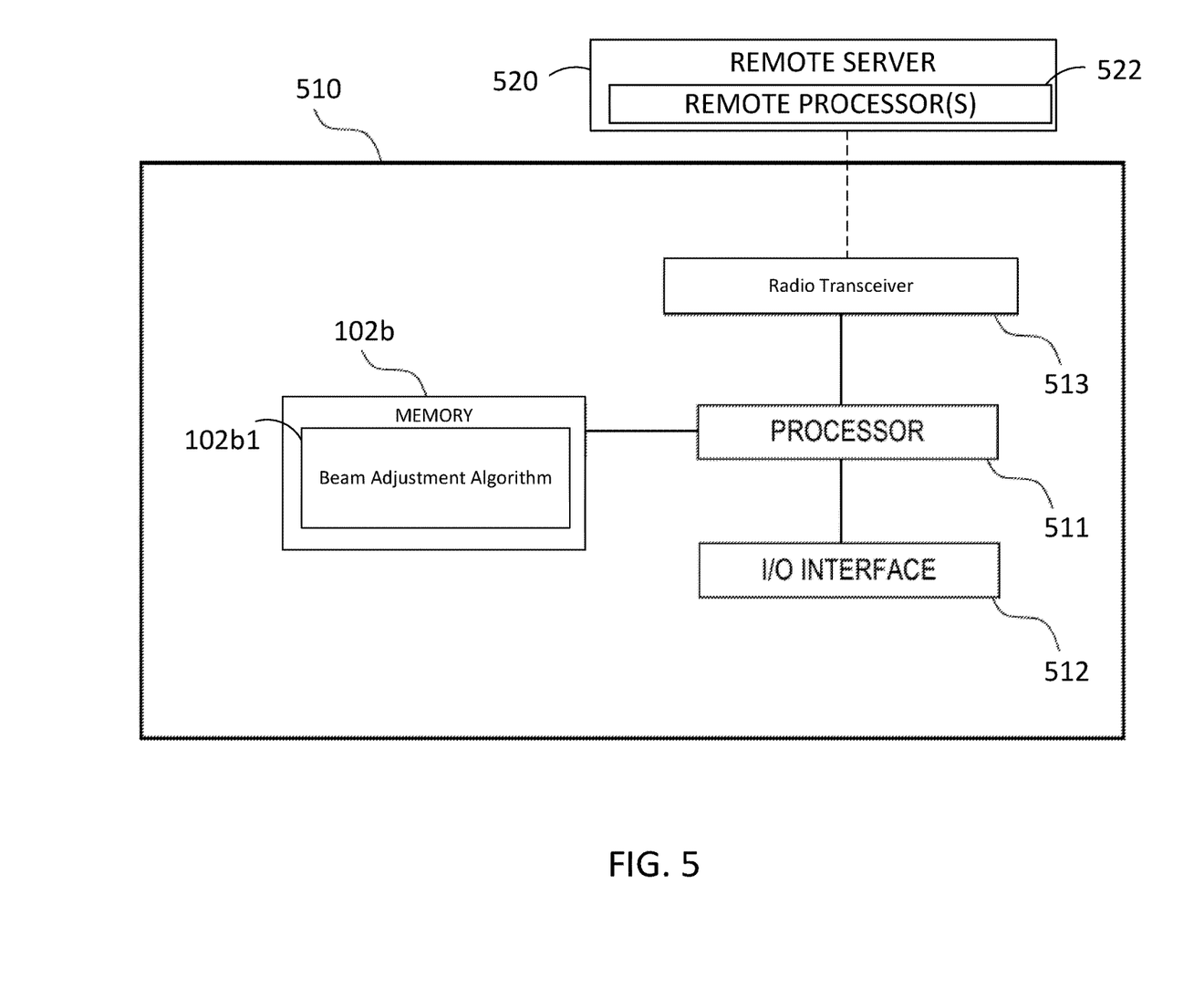
FIG. 5 is a block diagram of an example logic circuit for implementing example methods and/or operations described herein.

FIG. 5 is a block diagram representative of an example logic circuit capable of implementing example methods and/or operations described herein. As an example, the example logic circuit may be capable of implementing one or more components of the reader 102 of FIG. 1. Of course, it should be understood that the example logic circuit may also include and/or otherwise access instructions and/or components of other components represented in FIG. 1 and/or elsewhere herein, such as the server 110, the tags (e.g., tags 106a, 107a, 108a), and the like.

The example logic circuit of FIG. 5 is a processing platform 510 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 510 of FIG. 5 includes a processor 511 such as, for example, one or more microprocessors, controllers, and/or any suitable type of processor. The example processing platform 510 of FIG. 5 includes memory (e.g., volatile memory, non-volatile memory) 102b accessible by the processor 511 (e.g., via a memory controller). The example processor 511 interacts with the memory 102b to obtain, for example, machine-readable instructions stored in the memory 102b corresponding to, for example, the operations represented by the flowcharts of this disclosure. The memory 102b also includes the beam adjustment algorithm 102b1 that are accessible by the example processor 511.

The beam adjustment algorithm 102b1 may comprise rule-based instructions configured to, for example, cause the example processor 511 to analyze data received from tags to determine adjustments and/or adjust orientations/directions of signal beams emitted by the reader 102. More specifically, the beam adjustment algorithm 102b1 may comprise rule-based instructions configured to cause the example processor 511 to analyze data packets and/or information extracted, captured, and/or otherwise derived from the data packets to determine a number of stray tags within the coverage area of any signal beam emitted by the reader 102. The beam adjustment algorithm 102b1 may further comprise rule-based instructions configured to, for example, cause the example processor 511 to determine whether the number of stray tags captured by a particular signal beam exceeds and/or otherwise fails to satisfy the stray tag threshold and to determine and cause an adjustment to the direction/orientation of the particular signal beam that reduces the number of captured stray tags.

To illustrate, the example processor 511 may access the memory 102b to execute, reference, and/or otherwise interpret the beam adjustment algorithm 102b1 when receiving data packets from a proximate tag. Additionally, or alternatively, machine-readable instructions corresponding to the example operations described herein may be stored on one or more removable media (e.g., a compact disc, a digital versatile disc, removable flash memory, etc.) that may be coupled to the processing platform 510 to provide access to the machine-readable instructions stored thereon.

The example processing platform 510 of FIG. 5 also includes a radio transceiver 513 to enable communication with other machines via, for example, one or more networks. The example radio transceiver 513 includes any suitable type of communication interface(s) (e.g., wired and/or wireless interfaces) configured to operate in accordance with any suitable protocol(s) (e.g., Ethernet for wired communications, and/or BLE or IEEE 802.11 for wireless communications).

The example processing platform 510 of FIG. 5 also includes input/output (I/O) interfaces 512 to enable receipt of user input and communication of output data to the user. Such user input and communication may include, for example, any number of keyboards, mice, USB drives, optical drives, screens, touchscreens, etc.

Further, the example processing platform 510 may be connected to a remote server 520. The remote server 520 may include one or more remote processors 522, and may be configured to execute instructions to, for example, implement operations of the example methods described herein, as may be represented by the flowcharts of the drawings that accompany this description.

ADDITIONAL CONSIDERATIONS

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. An assembly comprising:
a transceiver configured to emit a plurality of signal beams that each have a respective coverage area and are oriented in a respective direction;
one or more processors; and
one or more memories communicatively coupled to the one or more processors storing a beam adjustment algorithm and instructions that, when executed by the one or more processors, cause the assembly to:
transmit, by the transceiver, a first signal beam of the plurality of signal beams to a set of tags located within a first respective coverage area of the first signal beam while the first signal beam is oriented in a first direction,
determine, by the beam adjustment algorithm, that a first tag threshold is violated based on a number of first tags located within the first respective coverage area, and
adjust, by the beam adjustment algorithm, an orientation of the first signal beam from the first direction to a second direction, wherein
the first tags correspond to stray tags, a second number of dynamic tags are also located within the first respective coverage area while the first signal beam is oriented in the first direction, and the first tag threshold corresponds to a ratio of stray tags to dynamic tags.

2. The assembly of claim 1, wherein a second number of first tags located within the first respective coverage area of the first signal beam while oriented in the second direction is less than the number of first tags located within the first respective coverage area of the first signal beam while oriented in the first direction.

3. The assembly of claim 1, wherein the first direction and the second direction include a respective azimuth component and a respective elevation component, and the instructions, when executed by the one or more processors, further cause the assembly to adjust the orientation of the first signal beam by:
adjusting a first respective azimuth component of the first direction to a second respective azimuth component of the second direction; or
adjusting a first respective elevation component of the first direction to a second respective elevation component of the second direction.

4. The assembly of claim 1, wherein after adjusting the orientation of the first signal beam to the second direction, the instructions, when executed by the one or more processors, further cause the assembly to:
(a) determine, by the beam adjustment algorithm, that the first tag threshold is violated based on a subsequent number of first tags located within the first respective coverage area;
(b) adjust, by the beam adjustment algorithm, the orientation of the first signal beam to a subsequent direction; and
iteratively perform steps (a) and (b) until the first tag threshold is satisfied.

5. The assembly of claim 1, wherein the instructions, when executed by the one or more processors, further cause the assembly to:
determine, by the beam adjustment algorithm, that (i) the second direction or (ii) the first respective coverage area of the first signal beam fails to satisfy a coverage threshold relative to a second signal beam of the plurality of signal beams; and
deactivate the first signal beam.

6. The assembly of claim 1, wherein first tags correspond to stray tags, and the instructions, when executed by the one or more processors, further cause the assembly to:
receive, by the transceiver, a response signal from a respective tag at a first time indicating that the respective tag is located within the first respective coverage area;
receive, by the transceiver, a subsequent response signal from the respective tag at a second time that is different from the first time indicating that the respective tag is located within the first respective coverage area; and
determine, by the beam adjustment algorithm, that the respective tag is a stray tag.

7. The assembly of claim 6, wherein the instructions, when executed by the one or more processors, further cause the assembly to:
receive, by the transceiver, a second response signal from a second respective tag at the first time indicating that the second respective tag is located within the first respective coverage area;
receive, by the transceiver, a third response signal from the second respective tag at the second time indicating that the respective tag is located within a second respective coverage area of a second signal beam of the plurality of signal beams; and
determine, by the beam adjustment algorithm, that the second respective tag is an dynamic tag.

8. A method comprising:
transmitting, by a transceiver configured to emit a plurality of signal beams that each have a respective coverage area and are oriented in a respective direction, a first signal beam of the plurality of signal beams to a set of tags located within a first respective coverage area of the first signal beam while the first signal beam is oriented in a first direction;
determining, by a beam adjustment algorithm, that a first tag threshold is violated based on a number of first tags located within the first respective coverage area; and
adjusting, by the beam adjustment algorithm, an orientation of the first signal beam from the first direction to a second direction, wherein
the first tags correspond to stray tags, a second number of dynamic tags are also located within the first respective coverage area while the first signal beam is oriented in the first direction, and the first tag threshold corresponds to a ratio of stray tags to dynamic tags.

9. The method of claim 8, wherein a second number of first tags located within the first respective coverage area of the first signal beam while oriented in the second direction is less than the number of first tags located within the first respective coverage area of the first signal beam while oriented in the first direction.

10. The method of claim 8, wherein the first direction and the second direction include a respective azimuth component and a respective elevation component, and the method further comprises adjusting the orientation of the first signal beam by:
adjusting a first respective azimuth component of the first direction to a second respective azimuth component of the second direction; or
adjusting a first respective elevation component of the first direction to a second respective elevation component of the second direction.

11. The method of claim 8, wherein after adjusting the orientation of the first signal beam to the second direction, the method further comprises:
  (a) determining, by the beam adjustment algorithm, that the first tag threshold is violated based on a subsequent number of first tags located within the first respective coverage area;
  (b) adjusting, by the beam adjustment algorithm, the orientation of the first signal beam to a subsequent direction; and
  iteratively performing steps (a) and (b) until the first tag threshold is satisfied.

12. The method of claim 8, further comprising:
  determining, by the beam adjustment algorithm, that (i) the second direction or (ii) the first respective coverage area of the first signal beam fails to satisfy a coverage threshold relative to a second signal beam of the plurality of signal beams; and
  deactivating the first signal beam.

13. The method of claim 8, wherein first tags correspond to stray tags, and the method further comprises:
  receiving, by the transceiver, a response signal from a respective tag at a first time indicating that the respective tag is located within the first respective coverage area;
  receiving, by the transceiver, a subsequent response signal from the respective tag at a second time that is different from the first time indicating that the respective tag is located within the first respective coverage area; and
  determining, by the beam adjustment algorithm, that the respective tag is a stray tag.

14. The method of claim 13, further comprising:
  receiving, by the transceiver, a second response signal from a second respective tag at the first time indicating that the second respective tag is located within the first respective coverage area;
  receiving, by the transceiver, a third response signal from the second respective tag at the second time indicating that the respective tag is located within a second respective coverage area of a second signal beam of the plurality of signal beams; and
  determining, by the beam adjustment algorithm, that the second respective tag is an dynamic tag.

15. A tangible machine-readable medium comprising instructions that, when executed, cause a machine to at least:
  transmit, by a transceiver configured to emit a plurality of signal beams that each have a respective coverage area and are oriented in a respective direction, a first signal beam of the plurality of signal beams to a set of tags located within a first respective coverage area of the first signal beam while the first signal beam is oriented in a first direction;
  determine, by a beam adjustment algorithm, that a first tag threshold is violated based on a number of first tags located within the first respective coverage area; and
  adjust, by the beam adjustment algorithm, an orientation of the first signal beam from the first direction to a second direction, wherein
  the first tags correspond to stray tags, a second number of dynamic tags are also located within the first respective coverage area while the first signal beam is oriented in the first direction, and the first tag threshold corresponds to a ratio of stray tags to dynamic tags.

16. The tangible machine-readable medium of claim 15, wherein the first direction and the second direction include a respective azimuth component and a respective elevation component, and the instructions, when executed, further cause the machine to adjust the orientation of the first signal beam by:
  adjusting a first respective azimuth component of the first direction to a second respective azimuth component of the second direction; or
  adjusting a first respective elevation component of the first direction to a second respective elevation component of the second direction.

17. The tangible machine-readable medium of claim 15, wherein after adjusting the orientation of the first signal beam to the second direction, the instructions, when executed, further cause the machine to:
  (a) determine, by the beam adjustment algorithm, that the first tag threshold is violated based on a subsequent number of first tags located within the first respective coverage area;
  (b) adjust, by the beam adjustment algorithm, the orientation of the first signal beam to a subsequent direction; and
  iteratively perform steps (a) and (b) until the first tag threshold is satisfied.

* * * * *